(12) United States Patent
Kraus

(10) Patent No.: US 9,114,905 B2
(45) Date of Patent: Aug. 25, 2015

(54) CONTAINER HAVING A LABELED TEXTURED SURFACE

(75) Inventor: Sebastian Kraus, Darmstadt (DE)

(73) Assignee: KAO Germany GmbH, Darmstadt (DE)

( * ) Notice: Subject to any disclaimer, the term of this patent is extended or adjusted under 35 U.S.C. 154(b) by 0 days.

(21) Appl. No.: 13/991,750

(22) PCT Filed: Dec. 21, 2011

(86) PCT No.: PCT/EP2011/073529
§ 371 (c)(1),
(2), (4) Date: Jun. 5, 2013

(87) PCT Pub. No.: WO2012/085042
PCT Pub. Date: Jun. 28, 2012

(65) Prior Publication Data
US 2013/0256178 A1    Oct. 3, 2013

(30) Foreign Application Priority Data

Dec. 23, 2010    (EP) ..................................... 10196829

(51) Int. Cl.
| | |
|---|---|
| *B65D 1/40* | (2006.01) |
| *B29C 45/14* | (2006.01) |
| *B29C 45/37* | (2006.01) |
| *B29C 49/24* | (2006.01) |
| *B65D 1/02* | (2006.01) |
| *B65D 23/08* | (2006.01) |
| *B29C 49/52* | (2006.01) |
| *B29L 31/00* | (2006.01) |
| *B29C 49/04* | (2006.01) |
| *B29C 49/06* | (2006.01) |

(52) U.S. Cl.
CPC .............. *B65D 1/40* (2013.01); *B29C 45/1418* (2013.01); *B29C 45/372* (2013.01); *B29C 49/24* (2013.01); *B29C 49/2408* (2013.01); *B65D 1/0223* (2013.01); *B65D 23/0864* (2013.01); *B29C 49/04* (2013.01); *B29C 49/06* (2013.01); *B29C 49/52* (2013.01); *B29C 2045/14918* (2013.01); *B29C 2049/2412* (2013.01); *B29L 2031/712* (2013.01); *B29L 2031/718* (2013.01)

(58) Field of Classification Search
CPC .... B29C 49/2408; B29C 49/52; B29C 49/06; B29C 2049/2412; B65D 1/40
USPC ................................. 220/674, DIG. 12, 62.14
See application file for complete search history.

(56) References Cited

U.S. PATENT DOCUMENTS

| 3,207,822 A | 9/1965 | Makowski |
| 4,639,207 A | 1/1987 | Slat |

(Continued)

FOREIGN PATENT DOCUMENTS

| DE | 17 04 025 | 5/1971 | | |
| GB | 2 428 402 | 1/2007 | | |
| JP | 2009-241990 A | * 10/2009 | ............... | B65D 1/40 |
| WO | 03 091118 | 11/2003 | | |
| WO | WO 2010/087148 A1 | * 8/2010 | ............. | B32B 27/32 |

OTHER PUBLICATIONS

International Search Report mailed Feb. 1, 2012.

*Primary Examiner* — Anthony Stashick
*Assistant Examiner* — Mollie Llewellyn
(74) *Attorney, Agent, or Firm* — Norris McLaughlin & Marcus, P.A.

(57) ABSTRACT

It is provided a container having at least in one part a textured surface (12), wherein the container (10) has an in-mold label (14) on the textured surface (12). An in-mold label (14) on a textured surface (12) dispenses with the need to provide a smooth area on an otherwise textured container (10) for attaching the label thereto. This facilitates the fabrication of containers (10) with textured surface (12). An in-mold label (14) on a textured surface (12) further provides a visually and/or haptically appealing labeling which provides a good durability on the surface.

16 Claims, 2 Drawing Sheets

(56) References Cited

U.S. PATENT DOCUMENTS

| | | |
|---|---|---|
| 4,802,295 A | 2/1989 | Darr |
| 5,332,542 A * | 7/1994 | Yamanaka et al. ............ 264/509 |
| 2002/0124945 A1 * | 9/2002 | Muir et al. .................... 156/245 |
| 2002/0150706 A1 * | 10/2002 | Tachi et al. .................. 428/34.5 |
| 2006/0065566 A1 * | 3/2006 | Steih .......................... 206/459.5 |
| 2007/0163990 A1 * | 7/2007 | Escobosa et al. ............. 215/382 |
| 2012/0040197 A1 * | 2/2012 | Suzuki et al. ................. 428/516 |

\* cited by examiner

CONTAINER HAVING A LABELED TEXTURED SURFACE

This application is a 371 application of PCT/EP2011/073529 filed Dec. 21, 2011, which claims foreign priority benefit under 35 U.S.C. §119 of European Application No. 10196829.5 filed Dec. 23, 2010.

The invention relates to a container having at least in one part a labeled textured surface, particularly for cosmetical and/or pharmaceutical products.

In-mold labeling is a labeling technique used for blow molded as well as injection molded and thermoformed containers or other plastic objects. In-mold labeling is a pre-decoration technique, i.e. the application of the label before the container is filled. In the in-mold labeling process, a label is placed in the open mold and held in place by vacuum ports, electrostatic attraction or other appropriate means. The mold is then closed and molten plastic resin is extruded or injected into the mold where it conforms to the shape of the object. The hot plastic encloses the label and the label becomes molded to the container wall. Among the wide variety of consumer products packaged in in-mold labeled containers are laundry products, household cleaners, personal care products, food and liquor.

However, a disadvantage with in-mold labeling is the danger of label distortion and wrinkles Further, blisters and bubbles caused by air trapped between label and package wall also can cause problems with the aesthetics and adhesion of the label.

In contrast to the difficulties of in-mold labeling, the demands of consumers and manufacturers towards attractive labeling of products are high and counting.

It is therefore an object of the invention to provide a container with improved labelling.

The object is achieved according to the invention by a container according to the features of claim 1, a method for manufacturing a container according to the features of claim 12, as well as a product according to the features of claim 15. Preferred embodiments of the invention are given by the dependent claims.

The container according to the invention having at least in one part a textured surface has an in-mold label on the textured surface. An in-mold label on a textured surface dispenses with the need to provide a smooth area on an otherwise textured container for attaching the label thereto. This facilitates the fabrication of containers with an labeled textured surface at least in one part. It was found that contrary to the usual prejudice, applying an in-mold label to a textured surface not necessarily causes label distortion, wrinkles or blisters causing reduced adhesion of the label to the surface. Particularly, it was found that in-mold labels on a textured surface can exhibit good durability. Insofar, the present invention overcomes a long-since deeply held prejudice among skilled persons. An in-mold label on a textured surface further contributes to the appearance of the container providing a visually and/or haptically appealing labeling.

The term "textured" according to the invention is to be understood as meaning the structural nature of a surface. The texture may have more or less regularity, wherein an elementary pattern, or texture element, repeatedly appears in a larger surface area. A texture may be a random texture such as that of cork, sand, ice, leather or woodgrain, or a regular geometric texture such as raised or indented cylindrical, square, round, rectangular or other shaped areas arranged in a pattern. A textured surface of a molded container may be formed by using common techniques, for example by etching a formerly smooth molding cavity. Further, a textured surface may be formed by adhering a relief material to the mold which can be removable. Particularly useful is a ceramic coating technique marketed under the tradename "Cera-Shibo" by Eschmann Textures, a process which adds a ceramic layer to the substrate.

This process provides durability and is especially useful in injection molding. The container according to the invention has a textured surface at least in one part. The container can have a textured surface on the body while the bottom and/or outlet usually have a smooth surface, or the container can have a textured surface in the lower or upper part of the body, on the front or the back of the body or in areas designed in any form for decoration or handling.

In a preferred embodiment the in-mold label is integrated in the shape profile of the container flush with the texture of the container surface. This provides that the molded label appears as part of the container making it an integral part of the molded container compared to glue applied or pressure sensitive labels that appear above the surface of the container. This provides the label to stay durably on the container and look good for the lifetime of the product. Especially for cosmetics labels durability and appealing look is important as particularly in the field of hair treatment products like hair tinting lotions, hair coloration products or shampoos containers are used repeatedly and also are exposed to water.

In a preferred embodiment the container is a blow-molded and/or injection-molded container. Containers manufactured from plastic resins can be manufactured efficiently utilizing blow-molding and/or injection techniques. Blow-molded containers such as plastic bottles can provide particularly uniform wall thicknesses. Injection-molded containers can provide greater precision compared to extrusion blow molding. Further, the container may be formed by a combination of injection and blow molding.

The texture of the surface can exhibit a raised or indented pattern having a certain pattern depth 11 (see FIG. 3). Modern plastic molding allows for a wide variety of pattern depth. Particularly, the texture can have a maximum pattern depth of ≤3 mm, preferably of ≤2.5 mm, more preferably of ≤2 mm. Such kind of maximum pattern depth can help avoiding the formation of wrinkles when the label is applied to the surface. When the depth is too large, tearing of label material may take place due to extensive elongation of the label material. In a preferred embodiment the textured surface has a pattern depth in the range of ≥0.5 mm to ≤3 mm, particularly in the range of ≥0.75 mm to ≤2.5 mm, preferably in the range of ≥1 mm to ≤2 mm. Such pattern depth can provide a good bonding of the in mold label to the texture and enhance the durability of the label on the textured surface. Such a pattern depth can even help the label to stick to the surface.

The in-mold label can have any desired form which can be attached to a container. Particularly, the in-mold label can have the form of a sheet. In a preferred embodiment the label has a thickness in the range of ≥40 μm to ≤130 μm, particularly in the range of ≥50 μm to ≤120 μm, preferably in the range of ≥55 μm to ≤110 μm. In another preferred embodiment the label has a thickness in the range of ≥85 μm to ≤100 μm. In a further preferred embodiment the label has a thickness in the range of ≥50 μm to ≤60 μm. Such a label thickness can avoid unsightly wrinkles or blisters which may cause reduced adhesion of the label to the surface. Further, such label thickness can support that the in-mold label is integrated in the shape profile of the container flush with the texture of the container surface.

In a preferred embodiment the label has a tensile strength in machine direction in the range of >80 N/mm$^2$ to ≤200 N/mm$^2$, particularly in the range of ≥100 N/mm$^2$ to 150 N/mm$^2$, preferably in the range of ≥120 N/mm² to ≤140 N/mm². In another preferred embodiment the label has a tensile strength in transverse direction in the range of ≥120 N/mm² to ≤300 N/mm², particularly in the range of ≥150 N/mm² to 260 N/mm², preferably in the range of ≥210 N/mm² to 240 N/mm². In a preferred embodiment the label has a tensile strength in machine direction in the range of ≥80 N/mm² to ≤200 N/mm², particularly in the range of ≥100 N/mm² to 150 N/mm², preferably in the range of ≥120 N/mm² to ≤140 N/mm² and/or a tensile strength in transverse direction in the range of ≥120 N/mm² to ≤300 N/mm², particularly in the range of ≥150 N/mm² to 260 N/mm², preferably in the range of ≥210 N/mm² to 240 N/mm². In most cases such a tensile strength is sufficient for avoiding label distortion when the label is applied to the surface of the container. The tensile strength is measured at a relative humidity of 50% and at a temperature of 23° C. The tensile strength can be measured according to DIN ISO EN 527.

The in-mold label is usable for molded containers. Suitable materials for the label include polyethylene, polypropylene, polycarbonate, polyvinylchloride (PVC), mixtures thereof or a blend of one of the afore-mentioned plastics with other materials. In a preferred embodiment the label comprises or is made of polyethylene and/or polypropylene. Preferably the label comprises or is made of oriented polypropylene. The term oriented polypropylene (OPP) means polypropylene that has been stretched in order to orient its molecules. This makes it stronger in the direction of orientation. Oriented polypropylene can provide an especially glossy film with excellent folding characteristics which can provide for especially attractive high-quality labels.

The container can be any kind of container particularly such as a bottle or jar for receiving a fluid, semi-liquid, cream and/or granular product, like powder. The material of the container can be a plastics material. The selection of a particular plastic resin is governed by several factors, such as the product being packaged, the prospective user of the product and the manner of dispensing that is desirable. Suitable materials for the container include polyethylene, polypropylene, polyethylene terephthalate (PET), polycarbonate, polyvinylchloride (PVC), mixtures thereof or a blend of one of the afore-mentioned plastics with other materials. A plastic resin that is particularly adapted for forming of a container to be used for a liquid, semi-liquid or cream cosmetic product is polyethylene terephthalate (PET). Blow molded containers particularly are made of high-density polyethylene (HDPE). Another commonly used plastic resin for manufacturing blow-molded containers is polypropylene. Particularly, the container comprises or is made of polyethylene and/or polypropylene, preferably polypropylene. The container can have the form of a bottle, a jar or any other form suitable for cosmetics, particularly hair treatment products.

In a preferred embodiment the label and the container comprise or are made of the same material. Suitably, the label and the container comprise or are made of polyethylene, polypropylene, polycarbonate, polyvinylchloride (PVC), mixtures thereof or a blend of one of the plastics with other materials. In a preferred embodiment the label and the container comprise or are made of polyethylene and/or polypropylene. Due to identical or similar properties of the materials if the label and the container comprise or are made of the same material the bonding between label and container can be strengthened.

In a preferred embodiment the label is a mono layered label (see FIG. 4). Particularly, a mono layered label is made of polyethylene and/or polypropylene. Preferably a mono layered label comprises or is made of oriented polypropylene. Depending on the designation and other aspects of the label desired, the label can comprise more than one layer.

In a preferred embodiment the label is a multilayered label (see FIG. 5). The label can comprise an optional backing layer. As shown in FIG. 5, a backing layer 30 can add to the thickness of the label, can add opacity, or can provide a cushion, so that the image layer 32 is not distorted from the temperature or pressure imposed by the extruded or injected plastic. Further, a backing layer can serve as a bonding layer to promote better adhesion of the label to the plastic used in the molding process. Further, the label can comprise a core layer, for example a plastics or paper or paper board layer. Further, the label can comprise on one or both sides a treated outer layer, for example providing a matt or glossy surface. The label can be printable and/or coatable. The label can further comprise an image layer. Suitable methods for adding optional layers include lamination, coating or extrusion coating. A multilayered label may have two, three or four layers, or even five or six layers. Proceeding from the outer or surface side to the inner or back side, a multilayered label may comprise an image layer, an outer layer, a core layer, and optionally an inner backing or bonding layer. Further, a multilayered label may comprise treated matt and/or glossy surfaces on one or both sides of the label. Such surfaces can give a smooth finish when molded. In-mold labels usually do not require an additional adhesive on the inner or back side.

The outer layer may comprise or be made of polyethylene and/or polypropylene, preferably of polypropylene, particularly oriented polypropylene. The inner backing layer or bonding layer may comprise or be made of polyethylene and/or polypropylene. An inner backing or bonding layer comprised or made of polyethylene can promote better adhesion of the label to a container made of polyethylene. A multilayered label preferably comprises an outer polypropylene layer, preferably oriented polypropylene layer, and at least one inner layer made of polyethylene. In a preferred embodiment the multilayered label has a total thickness in the range of ≥40 μm to ≤130 μm, particularly in the range of ≥50 μm to ≤120 μm, preferably in the range of ≥55 μm to ≤110 μm. In another preferred embodiment the multilayered label has a total thickness in the range of ≥85 μm to ≤100 μm. In a further preferred embodiment the multilayered label has a total thickness in the range of ≥50 μm to ≤60 μm.

The invention further relates to a method for manufacturing a container having at least in one part a textured surface and an in mold label on the textured surface, comprising the steps of:
 a) proving a mold cavity with a textured surface at least in one part of the mold cavity,
 b) placing the label on the surface,
 c) processing a plastic material into the mold cavity,
 d) molding the container.

In-Mold labeling can be achieved using different methods. All molding methods share the procedural step that the label is applied during the molding of the container. Molded plastic containers can be produced by a number of different procedures, particularly injection and blow molding methods, including what are known as extrusion blow molding, injection blow molding, stretch blow molding and any combination of injection and blow molding. Hence, the step of processing a plastic material into the mold cavity particularly can include extruding and/or injecting the plastic material into the mold cavity.

In a preferred embodiment the method is a blow molding method and molding the container is achieved by blowing pressured air into the cavity. In blow molding methods a plastic material particularly is extruded as a parison into the mold cavity. Using a blow molding method, the invention particularly relates to a method for manufacturing a container having at least in one part a textured surface and an in mold label on the textured surface, comprising the steps of:
a) proving a mold cavity with a textured surface at least in one part of the mold cavity,
b) placing the label on the surface,
c) extruding a plastic material as a parison into the mold cavity,
d) molding the container by blowing pressured air into the cavity.

Blow molding allows for a wide variety of container shapes, sizes and neck openings. Blow molded containers can also have their weights adjusted through an extremely wide range. Further, extrusion blow molds are generally much less expensive than injection blow molds and can be produced in a much shorter period of time. Further advantages of blow molding include a high rate of production, low tooling costs, and a vast majority of machine manufactures.

Extrusion Blow Molding is the simplest type of blow molding. Generally, a hot parison of plastic material is dropped from an extruder and captured in a preferably water cooled mold. Once the molds are closed, air is injected through the top or the neck of the container. The air pressure is sufficient to expand and stretch the parison to its finished shape. When the hot plastic material is blown up and touches the walls of the mold the material cools down and the container maintains its rigid shape. After the blow molding process is complete, cooling air can be cycled in and out of the finished container for curing. Afterwards, the mold can be opened and the container can be removed. Preferably, the plastic material when extruded into the mold cavity has a resin temperature in the range of $\geq 130°$ C. to $\leq 340°$ C., particularly in the range of $\geq 175°$ C. to $\leq 220°$ C., preferably in the range of $\geq 180°$ C. to $\leq 210°$ C. Preferably, the container is molded using a blowing pressure in the range of $\geq 4$ kgf/cm$^2$ to 6 kgf/cm$^2$, particularly in the range of $\geq 4.5$ kgf/cm$^2$ to 5.5 kgf/cm$^2$, preferably in the range of $\geq 4.8$ kgf/cm$^2$ to 5 kgf/cm$^2$. The adjustment of the operating parameters of the molding process does vary from one container to another, but this is within the skill of those experienced in the art of injection/blow molding processes.

Alternatively, the method can be an injection molding method and a plastic material particularly is injected into the mold cavity. With injection molding methods, usually a granular plastic is fed from a hopper into a heated barrel where the resin is heated to the appropriate melting temperature. The melted plastic is forced into the mold, for example through a nozzle that rests against the mold. The resin also can be injected into the mold by a reciprocating screw or a ram injector. The mold is cooled constantly to a temperature that allows the resin to solidify. The mold plates can be held together by hydraulic or mechanical force. Once the container is cooled sufficiently to harden, the mold opens and the container is ejected.

Alternatively, the method can be an injection blow molding method. Injection blow molding is part injection molding and part blow molding, wherein a melted plastic is injection molded around a blowing rod which produces a preform parison. The preform parison is then transferred on the core rod and placed inside another blow mold cavity. Air is then blown through the core rod until the preform parison takes the shape of the mold cavity.

The mold has at least in one part a textured surface. If the container to be produced shall have a textured surface on the whole body, the mold will have a textured surface on the whole mold cavity. Further, depending on the desired form of the container, the mold can have a textured surface in the lower or upper part of the cavity, on the front or the back of the cavity or in areas designed in any form for decoration or handling of the container. A textured surface of a mold may be formed by using common techniques, for example by etching a formerly smooth molding cavity. Further, a textured surface may be formed by adhering a relief material to the mold which can be removable. Particularly useful is a ceramic coating technique marketed under the tradename "Cera-Shibo" by Eschmann Textures, a process which adds a ceramic layer to the substrate of the cavity. This process provides durability and is especially useful in injection molding.

The texture of the cavity surface can exhibit a raised or indented pattern having a certain pattern depth. Modern plastic molding allows for a wide variety of pattern depth. Particularly, the texture has a maximum pattern depth s of $\leq 3$ mm, preferably of $\leq 2.5$ mm, more preferably of $\leq 2$ mm. Such kind of maximum pattern depth can help avoiding the formation of wrinkles when the label is applied to the surface. In a preferred embodiment the textured surface of the cavity has a pattern depth in the range of $\geq 0.5$ mm to $\leq 3$ mm, particularly in the range of $\geq 0.75$ mm to $\leq 2.5$ mm, preferably in the range of $\geq 1$ mm to $\leq 2$ mm. Such pattern depth can provide a good bonding of the in mold label to the texture.

The in-mold label can have any desired form which can be attached to the container. Particularly, the in-mold label can have the form of a sheet. In a preferred embodiment the label has a thickness in the range of $\geq 40$ μm to $\leq 130$ μm, particularly in the range of $\geq 50$ μm to $\leq 120$ μm, preferably in the range of $\geq 55$ μm to $\leq 110$ μm. In another preferred embodiment the label has a thickness in the range of $\geq 85$ μm to $\leq 100$ μm. In a further preferred embodiment the label has a thickness in the range of $\geq 50$ μm to $\leq 60$ μm. The thickness is measured from a flat part or minimum height of the texture to the maximum height of the texture. In a preferred embodiment the label has a tensile strength in machine direction in the range of $\geq 80$ N/mm$^2$ to $\leq 200$ N/mm$^2$, particularly in the range of $\geq 100$ N/mm$^2$ to 150 N/mm$^2$, preferably in the range of $\geq 120$ N/mm$^2$ to $\leq 140$ N/mm$^2$. In another preferred embodiment the label has a tensile strength in transverse direction in the range of $\geq 120$ N/mm$^2$ to $\leq 300$ N/mm$^2$, particularly in the range of $\geq 150$ N/mm$^2$ to 260 N/mm$^2$, preferably in the range of $\geq 210$ N/mm$^2$ to 240 N/mm$^2$. In a preferred embodiment the label has a tensile strength in machine direction in the range of $\geq 80$ N/mm$^2$ to $\leq 200$ N/mm$^2$, particularly in the range of $\geq 100$ N/mm$^2$ to 150 N/mm$^2$, preferably in the range of $\geq 120$ N/mm$^2$ to $\leq 140$ N/mm$^2$ and/or a tensile strength in transverse direction in the range of $\geq 120$ N/mm$^2$ to $\leq 300$ N/mm$^2$, particularly in the range of $\geq 150$ N/mm$^2$ to 260 N/mm$^2$, preferably in the range of $\geq 210$ N/mm$^2$ to 240 N/mm$^2$. In most cases this tensile strength is sufficient for avoiding label distortion when the label is applied to the surface of the container. The tensile strength is measured at a relative humidity of 50% and at a temperature of 23° C. The tensile strength can be measured according to DIN ISO EN 527.

Suitable plastic materials for the container include polyethylene, polypropylene, polyethylene terephthalate (PET), polycarbonate, polyvinylchloride (PVC), mixtures thereof or a blend of one of the afore-mentioned plastics with other materials. A plastic resin that is particularly adapted for forming of a container to be used for a liquid, semi-liquid or cream cosmetic product is polyethylene terephthalate (PET). For blow molding of containers particularly high-density polyethylene (HDPE) is usable. Another commonly used plastic resin for manufacturing blow-molded containers is polypropylene. A preferred material for molding the container is polyethylene and/or polypropylene, preferably polypropylene. Regardless of which plastic is selected, the relative shape of both the parison and the method of forming the finished container is basically the same.

Suitable materials for the label include polyethylene, polypropylene, polycarbonate, polyvinylchloride (PVC), mixtures thereof or a blend of one of the afore-mentioned plastics with other materials. In a preferred embodiment the label comprises or is made of polyethylene and/or polypropylene. Preferably the label comprises or is made of oriented polypropylene.

In a preferred embodiment the same material is used for the label and the container. Suitably, the label and the container comprise or are made of polyethylene, polypropylene, polycarbonate, polyvinylchloride (PVC), mixtures thereof or a blend of one of the plastics with other materials. In a preferred embodiment the label and the container comprise or are made of polyethylene and/or polypropylene.

The label can be a mono layered label. Particularly, a mono layered label is made of polyethylene and/or polypropylene. Preferably a mono layered label comprises or is made of oriented polypropylene. In a preferred embodiment the label is a multilayered label. Depending on the designation and other aspects of the label desired, the label can comprise more than one layer. The label can comprise an optional backing layer. Further, the label can comprise a core layer, for example a plastics or paper or paper board layer. Further, the label can comprise on one or both sides a treated outer layer, for example providing a matt or glossy surface. The label can be printable and/or coatable. The label can further comprise an image layer. Suitable methods for adding optional layers include lamination, coating or extrusion coating. A multilayered label may have two, three or four layers, or even five or six layers. Proceeding from the outer or surface side to the inner or back side, a multilayered label may comprise an image layer, an outer layer, a core layer, and optionally an inner backing or bonding layer. Further, a multilayered label may comprise treated matt and/or glossy surfaces on one or both sides of the label. Such surfaces can give a smooth finish when molded. In-mold labels usually do not require an additional adhesive on the inner or back side.

The outer layer may comprise or be made of polyethylene and/or polypropylene, preferably of polypropylene, particularly oriented polypropylene. The inner backing layer or bonding layer may comprise or be made of polyethylene and/or polypropylene. An inner backing or bonding layer comprised or made of polyethylene can promote better adhesion of the label to a container made of polyethylene. A multilayered label preferably comprises an outer polypropylene layer, preferably oriented polypropylene layer, and at least one inner layer made of polyethylene. In a preferred embodiment the multilayered label has a total thickness in the range of ≥40 μm to ≤130 μm, particularly in the range of ≥50 μm to ≤120 μm, preferably in the range of ≥55 μm to ≤110 μm. In another preferred embodiment the multilayered label has a total thickness in the range of ≥85 μm to ≤100 μm. In a further preferred embodiment the multilayered label has a total thickness in the range of ≥50 μm to ≤60 μm.

The invention further relates to a container having at least in one part a textured surface, wherein the container has an in-mold label on the textured surface, obtained by the method according to the invention.

The invention further relates to a product, preferably a cosmetic product, comprising at least one container according to the invention and at least one composition, preferably a cosmetic composition, filled into it. The cosmetic composition can be a fluid, semi-liquid, cream and/or granular product, like powder. The cosmetic composition preferably is a hair treatment product like hair tinting lotions, hair coloration products or shampoos.

In the following the invention is explained in detail by example with reference to the enclosed drawing showing a preferred embodiment of the present invention.

In the drawings

Figure 1:
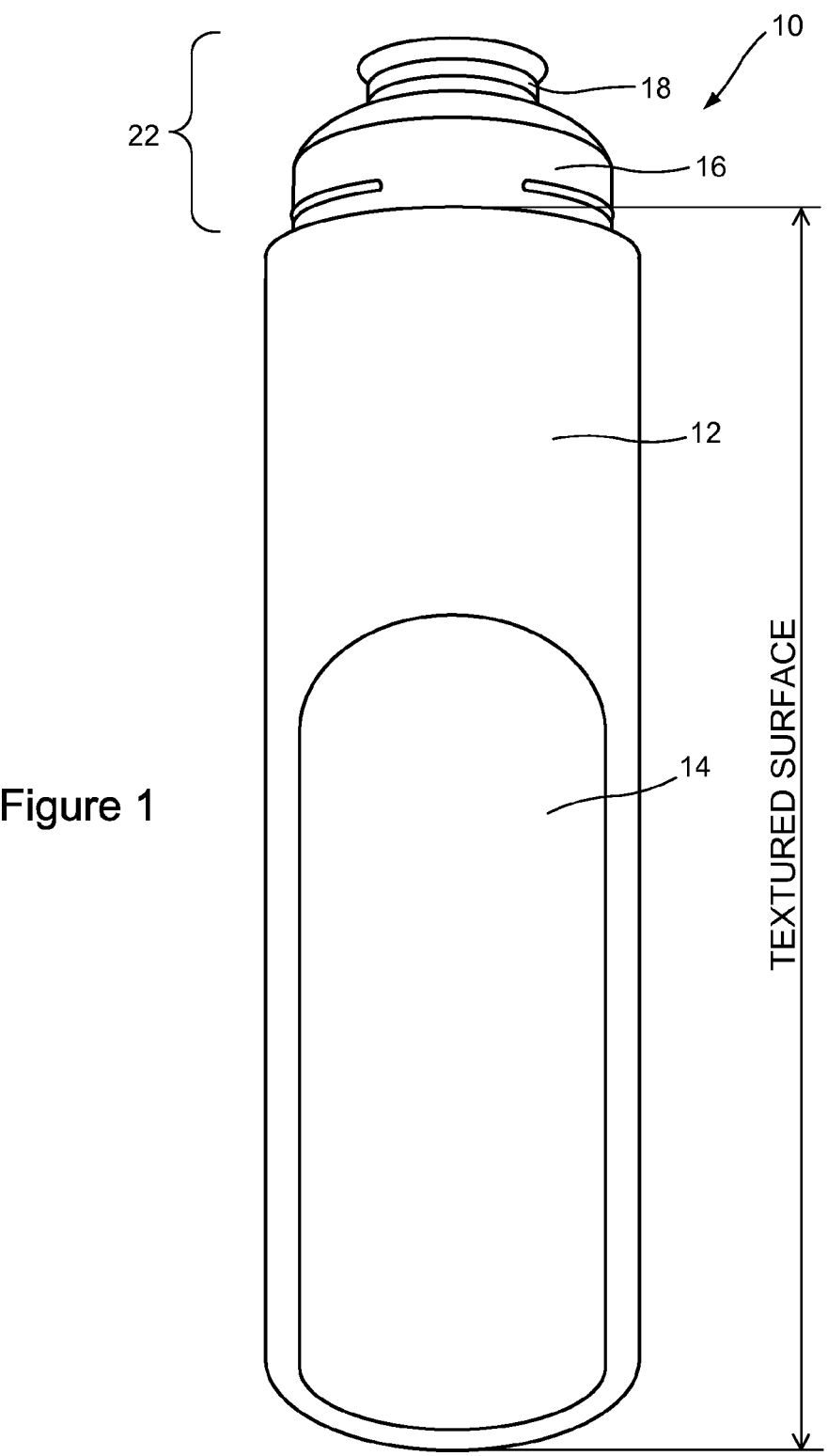
FIG. 1 is a schematic side view of a first embodiment of a container having an in-mold label on a textured surface.

The container 10 as illustrated in FIG. 1 comprises at least in one part a textured surface 12.

The container 10 in the illustrated embodiment has a textured surface 12 over the whole container body, wherein the outlet 22 including an annular shoulder 16 and an upper neck 18 has a smooth surface. The outlet 22 is capable of being sealed by a closure (not shown). The container 10 in form of a bottle with outlet 22 is one-piece in the illustrated embodiment and particularly made by plastic blow molding. The container 10 in the illustrated embodiment shows a regular geometric texture of rectangular shaped areas arranged in a pattern. The container 10 has an in-mold label 14 on the textured surface 12. The in-mold label 14 is integrated in the shape profile of the container 10 flush with the texture of the container surface.

Figure 2:
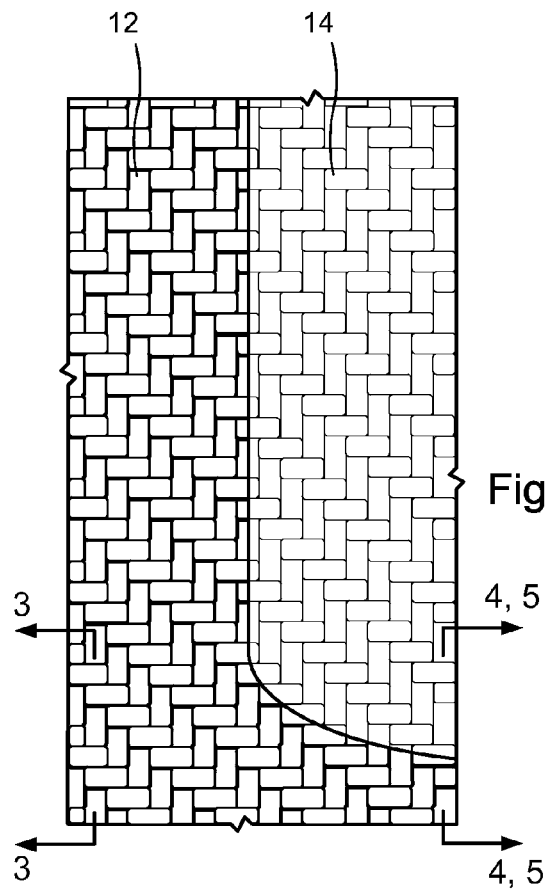
FIG. 2 is a detail of the schematic side view of the embodiment of FIG. 1.
Figure 3:
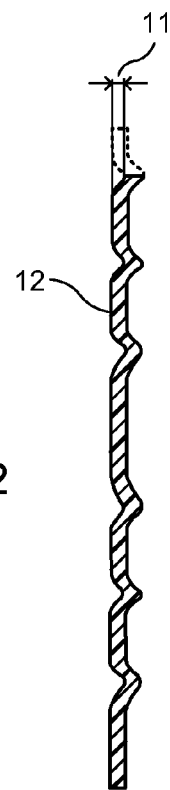
FIG. 3 is a cross-sectional view of the container along a line 3-3 in FIG. 2.
Figure 4:
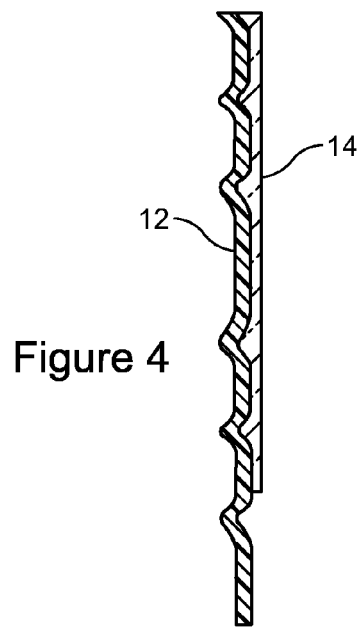
FIG. 4 is a cross-sectional view of the container along a line 4-4 in FIG. 2.
Figure 5:
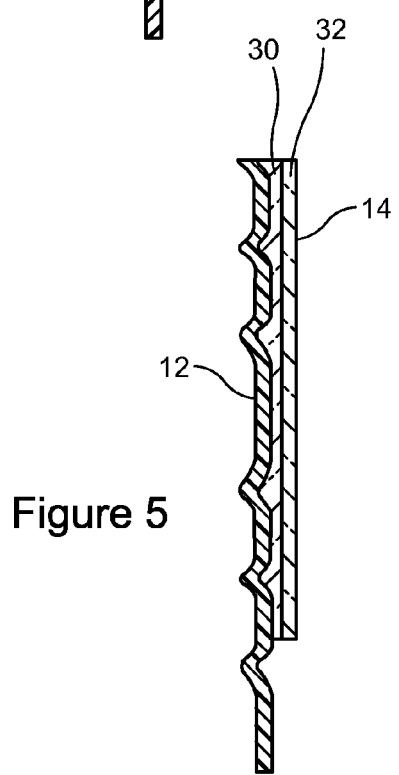
FIG. 5 is a cross-sectional view of a second embodiment of a container along a line 5-5 in FIG. 2.

The detail of the container 10 as illustrated in FIG. 2 shows the regular geometric texture of rectangular shaped areas arranged in a pattern and the in-mold label 14 on the textured surface 12 exhibiting a visually appealing labelling without wrinkles or label distortion.

The invention claimed is:

1. A container having at least in one part a textured surface, wherein the container has an in-mold label on the textured surface, wherein the in-mold label has a thickness in the range of ≥50 μm to ≤110 μm, a tensile strength in a machine direction in a range of ≥80 N/mm$^2$ to ≤200 N/mm$^2$, and a tensile strength in a transverse direction in the range of ≥120 N/mm$^2$ to ≤300 N/mm$^2$.

2. The container according to claim 1, wherein a back side of the in-mold label directly contacts the textured surface of the container.

3. The container according to claim 1, wherein the container is a blow-molded container or an injection-molded container.

4. The container according to claim 1, wherein the textured surface has a pattern depth in the range of ≥0.5 mm to ≤3 mm.

5. The container according to claim 1, wherein the in-mold label has a thickness in the range of ≥85 μm to ≤100 μm.

6. The container according to claim 1, wherein the in-mold label has a tensile strength in the machine direction in the range of ≥100 N/mm$^2$ to ≤150 N/mm$^2$ and a tensile strength in the transverse direction in the range of ≥150 N/mm$^2$ to ≤260 N/mm$^2$.

7. The container according to claim 1, wherein the in-mold label comprises or is made of polyethylene or polypropylene.

8. The container according to claim 1, wherein the in-mold label and the container comprise or are made of a same material that comprises polyethylene and/or polypropylene.

9. The container according to claim 1, wherein the in-mold label is a mono layered label.

10. The container according to claim 1, wherein the in-mold label is a multilayered label comprising an outer polypropylene layer and at least one inner layer made of polyethylene.

11. A method for manufacturing a container, having at least in one part a textured surface and an in mold label on the textured surface, the method comprising:
   a) providing a mold cavity with a textured surface at least in one part of the mold cavity,
   b) placing the in-mold label on the textured surface of the mold cavity, wherein the in-mold label has a thickness in the range of $\geq 50$ μm to $\leq 110$ μm, a tensile strength in a machine direction in a range of $\geq 80$ N/mm$^2$ to $\leq 200$ N/mm$^2$, and a tensile strength in a transverse direction in the range of $\geq 120$ N/mm$^2$ to $\leq 300$ N/mm$^2$,
   c) processing a plastic material into the mold cavity, and
   d) molding the container.

12. The method according to claim 11, wherein the method is a blow molding method and molding the container is achieved by blowing pressured air into the cavity.

13. A container having at least in one part a textured surface, wherein the container has an in-mold label on the textured surface, and is obtained by the method according to claim 11, wherein the in-mold label has a thickness in the range of $\geq 50$ μm to $\leq 110$ μm, a tensile strength in the machine direction in a range of $\geq 80$ N/mm$^2$ to $\leq 200$ N/mm$^2$, and a tensile strength in the transverse direction in the range of $\geq 120$ N/mm$^2$ to $\leq 300$ N/mm$^2$.

14. A cosmetic product, comprising the container according to claim 1 and at least one cosmetic composition, filled into the container.

15. The container according to claim 1, wherein the in-mold label comprises or is made of oriented polypropylene.

16. The container according to claim 1, wherein the in-mold label has a thickness in the range of $\geq 50$ μm to $\leq 60$ μm.

* * * * *